United States Patent Office 3,463,780
Patented Aug. 26, 1969

3,463,780
4(2'-BETA-PYRIDYL METHYLOXYCARBONYL PHENYLAMINO)-CHLOROQUINOLINES
André Allais, Les Lilas, France, assignor to Roussel-UCLAF, Paris, France, a corporation of France
No Drawing. Filed June 25, 1968, Ser. No. 739,661
Claims priority, application France, June 28, 1967, 112,485
Int. Cl. C07d 57/00; A61k 25/00
U.S. Cl. 260—287        3 Claims

ABSTRACT OF THE DISCLOSURE

A chloroquinoline of the formula

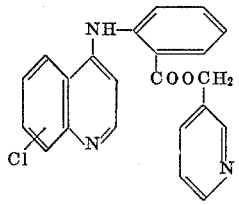

I wherein the chlorine atom is present in the molecule in a position selected from the group consisting of the 7 position and the 8 position, as well as its non toxic, pharmaceutically acceptable acid addition salts. The chloroquinolines of the invention have a very noteworthy anti-inflammatory action and a valuable analgesic action.

PRIOR APPLICATION

The present application is based on French convention application Ser. No. 112,485 filed June 29, 1967, the priority of which is hereby claimed.

OBJECTS OF THE INVENTION

It is an object of the invention to provide novel chloroquinolines of Formula I and their non-toxic, pharmaceutically acceptable acid addition salts.

It is another object of the invention to provide novel anti-inflammatory and analgesic compositions.

It is an additional object of the invention to provide a novel method of relieving inflammation and pain in warm-blooded animals.

These and other objects and advantages of the invention will become obvious from the following detailed description.

THE INVENTION

The novel products of the invention are the chloroquinolines of the formula

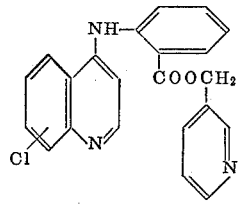

I wherein the chlorine atom is present in the molecule in a position selected from the group consisting of the 7-position and the 8-position and their non toxic, pharmaceutically acceptable acid addition salts.

The novel compounds of the invention are prepared by reacting 3-hydroxymethylpyridine with 4-(2'-methoxycarbonylphenylamino)-chloroquinoline wherein the chlorine atom is present in the molecule in a position selected from the group consisting of the 7-position and the 8-position to form the desired chloroquinoline compound of Formula I which may be converted into its acid addition salts by reaction with an organic or inorganic acid.

The novel compounds of the invention possess interesting pharmacological activity, namely a very noteworthy anti-inflammatory activity and a valuable analgesic activity. They are useful for the treatment of inflammatory diseases such as ankylosing spondylarthritis, acute articular rheumatism, arthrosis, dicopathy, lumbago, zona and for a complementary treatment of febrile and infectious conditions and of various algia.

The anti-inflammatory and analgesic compositions of the invention are comprised of at least one compound selected from the group consisting of a chloroquinoline of the formula

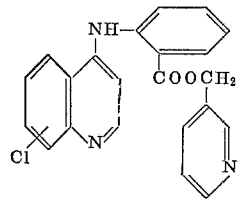

I wherein the chlorine atom is present in the molecule in a position selected from the group consisting of the 7-position and the 8-position, and its non-toxic, pharmaceutically acceptable acid addition salts, and a major amount of a pharmaceutical carrier.

They may be prepared in the form of injectable solutions or suspensions, put up in ampoules and multidose flacons, in tablets, in coated tablets, in capsules, in suppositories, in pomades and in creams according to known methods.

The novel method of the invention of relieving inflammatory conditions and pain in warm-blooded animals comprises administering to warm-blooded animals an effective amount of at least one compound selected from the group consisting of a chloroquinoline of the formula

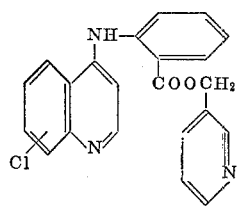

I wherein the chlorine atom is present in the molecule in a position selected from the group consisting of the 7-position and the 8-position, and its non-toxic, pharmaceutically acceptable acid addition salts.

The said compounds may be administered orally, transcutaneously, rectally or topically on the skin and mucous membranes.

3

The useful dosage is between 3 mg. to 35 mg./kg. per day depending upon the mode of administration.

In the following example there is described a preferred embodiment to illustrate the invention. However, it should be understood that the invention is not intended to be limited to the specific embodiment.

EXAMPLE

Preparation of 4-[2'β-pyridylmethyloxycarbonyl phenylamino]-7-chloroquinoline 0.05 gm. of sodium and 10 cc. of hydroxymethyl pyridine were heated at 65–70° C. for 15 hours. Then, 5 gm. of 4-[2'-carbomethoxy phenylamino] 7-chloroquinoline [prepared by the process of Belgium Patent 619,997] were added and the whole was heated at 95–100° C. for 7½ hours. After cooling the reaction mixture to room temperature, 100 cc. of water were added. Then, the precipitate was filtered, washed with water until the wash waters were neutral and dissolved into 200 cc. of N hydrochloric acid. The solution obtained was treated with carbon black, filtered, then alkalized with ammonia and extracted with methylene chloride. The extracts were washed with water until neutrality, dried over sodium sulfate and evaporated to dryness in vacuo. 2.7 gm. of crude product were obtained and purified by recrystallization from cyclohexane to procure 1.9 gm. of 4-[2'β-pyridylmethyloxycarbonyl phenylamino]-7-chloroquinoline.

The 4-[2'-β-pyridylmethyloxycarbonyl phenylamino]-7-chloroquinoline occurs in the form of yellow needles, soluble in chloroform, fairly soluble in acetone, sparingly soluble in benzene and alcohol, insoluble in water and ether.

Its melting point, determined on the Kofler block is 153–154° C.

$Analysis.$—$C_{22}H_{16}N_3ClO_2$=389.83. Calculated: C, 67.78%; H, 4.14%; N, 10.78%; Cl, 9.09%. Found: C, 68.0%; H, 4.4%; N, 10.6%; Cl, 9.1%.

This compound is not described in the literature.

By working in the same manner, starting from 4-[2'-carbomethoxy phenylamino] - 8 - chloroquinoline (prepared by the process of Belgium Patent 619.997), 4-[2'-β-pyridylmethyloxycarbonyl phenylamino]-8-chloroquinoline was obtained.

The compound is not described in the literature.

PHARMACOLOGICAL STUDY

Anti-inflammatory activity

The test employed was that described by Branceni et. al. (Arch. Int. Pharmacodyn., 1964, 152, 15), slightly modified. This consisted in the administration to rats weighing approximately 150 gm. each of a single injection of 500γ of naphthoyl-heparamide into the skin of the sole of a hind paw, this injection being intended to develop an inflammatory edema. The product to be studied was orally administered in an aqueous suspension, one hour prior to the injection. The amount of inflammation was determined by plethysmometry, the size of the paw being measured immediately prior and 2 hours after the irritating injection. The results obtained were expressed:

(a) either by the degree of inflammation calculated as a percentage of that of the control animals, this degree of inflammation being furnished by the difference of the averages of the two measurements (average volume at the hour $H_2$, average initial volumes $H_0$), (b) or by the volumes at the hour $H_2$, adjusted to their initial level by the analysis of covariance. The statistic validity of the differences between each adjusted average and that of the control group was established by the Dunnett test (Amer. J. St. Assoc., 50, 1096 [1955]).

4

The 4-[2'-β-pyridylmethyloxycarbonyl phenylamino]-7-chloroquinoline, utilized as an aqueous suspension, was orally administered at doses of 10 and 100 mg./kg.

The following table summarizes the results obtained:

| Lots | Doses administered, mg./kg. | Volume at the hour $H^2$; average adjusted by analysis of covariance | Degree of inflammation in percent of that of the controls |
| --- | --- | --- | --- |
| Controls | 0 | 41.1 | 100 |
| Treated | 10 | 35.0 | 47 |
| Controls | 0 | 62.3 | 100 |
| Treated | 100 | 43.9 | 25 |

According to the results, it can be ascertained that the tested compound possesses a distinct anti-inflammatory activity and the 50% active dose is approximately 10 mg./kg.

Analgesic activity

The test employed was based on the fact noted by Koster et al. (Fed. Proc., 1959, 18, 412) according to which the intraperitoneal injection of acetic acid provoked repeated characteristic movements of stretching and twisting persisting in mice for more than six hours. Analgesics prevent or suppress this syndrome which is an exterior manifestation of a diffuse abdominal pain.

A solution of 6 parts per thousand of acetic acid in water containing 10% of arabic gum was employed and the dose releasing the syndrome in mice under these conditions was 0.01 cc./gm., being 60 mg./kg. of acetic acid. The analgesics were administered orally to groups of five mice, which had not been fed for 24 hours, a half hour before the intraperitoneal injection of the acetic acid. The stretchings were observed, noted and counted for each mouse and then additionally by groups of five, during a period of observation of fifteen minutes immediately after the injection of acetic acid.

The 4-[2'-β-pyridylmethyloxycarbonyl phenylamino]-7-chloroquinoline was administered in the form of an aqueous suspension.

According to the test, the 50% active dose is approximately 50 mg./kg.; under the same test conditions, the 50% active dose of aspirin is 165 mg./kg.

We claim:

1. A chloroquinoline compound selected from the group consisting of a chloroquinoline of the formula

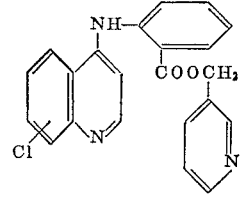

wherein the chlorine atom is present in the molecule in a position selected from the group of the 7 position and the 8 position; and its non-toxic pharmaceutically acceptable acid addition salts.

2. The chloroquinoline compound of claim 1 wherein the chlorine atom is in the 7 position.

3. The chloroquinoline compound of claim 1 wherein the chlorine atom is in the 8 position.

References Cited

UNITED STATES PATENTS 3,131,185  4/1964  Lafon _____ 260—287 X
3,232,944  1/1966  Allais et al. _____ 260—287

ALEX MAZEL, Primary Examiner

D. G. DAUS, Assistant Examiner

U.S. Cl. X.R.

260—297; 424—258